(12) United States Patent
Worwag

(10) Patent No.: US 7,246,408 B2
(45) Date of Patent: Jul. 24, 2007

(54) CLEANING TOOL WITH ROTATABLY DRIVEN WORKING TOOL

(75) Inventor: Peter Worwag, Staad (CH)

(73) Assignee: Düpro AG, Romanshorn (CH)

( * ) Notice: Subject to any disclaimer, the term of this patent is extended or adjusted under 35 U.S.C. 154(b) by 580 days.

(21) Appl. No.: 10/707,196

(22) Filed: Nov. 26, 2003

(65) Prior Publication Data

US 2004/0103497 A1    Jun. 3, 2004

(30) Foreign Application Priority Data

Nov. 30, 2002   (DE)   .............................. 102 56 030

(51) Int. Cl.
*A47L 9/04*     (2006.01)
*A47L 5/26*     (2006.01)

(52) U.S. Cl. .......................... 15/377; 15/389
(58) Field of Classification Search .................. 15/377, 15/387–390
See application file for complete search history.

(56) References Cited

U.S. PATENT DOCUMENTS 1,294,468 A * 2/1919 Hunsicker .................... 15/390
1,448,397 A * 3/1923 Friend ......................... 15/354

FOREIGN PATENT DOCUMENTS

DE    2126999    * 2/1972

* cited by examiner

*Primary Examiner*—Terrence R. Till
(74) *Attorney, Agent, or Firm*—Gudrun E. Huckett

(57) ABSTRACT

A cleaning tool for a vacuum cleaning device has a housing having a bottom plate with a working slot. A rotatingly driven working tool is rotatably supported in the housing and passes through the working slot to act on a surface to be cleaned. A motor is arranged in the housing and has a motor shaft. A gear system is connected between the motor and the working tool, wherein the gear system has a driving wheel driven by the motor shaft and a driven wheel fixedly connected to the working tool. The driving wheel and the driven wheel are V-belt pulleys and have a peripheral groove, respectively. The gear system further has a V-gear positioned between the driving wheel and the driven wheel, wherein the V-gear has an outer periphery that engages the peripheral grooves for establishing a driving connection between the driving wheel and the driven wheel.

20 Claims, 4 Drawing Sheets

CLEANING TOOL WITH ROTATABLY DRIVEN WORKING TOOL

BACKGROUND OF INVENTION

1. Field of the Invention

The invention relates to a cleaning tool having a rotatably driven working tool, in particular, for use in connection with a vacuum cleaning device such as a vacuum cleaner or the like. The cleaning tool comprises a housing with a bottom plate, and the bottom plate has a working slot through which the working tool that is rotatably supported in the housing acts on a surface to be worked on. A motor is arranged in the housing and drives by means of a gear system the working tool. The gear system comprises a driving wheel driven by the motor shaft as well as a driven wheel fixedly connected to the working tool.

2. Description of the Related Art

Cleaning tools configured as a vacuum cleaning tool with a rotatingly driven brush roller are known as attachments for vacuum cleaners. The vacuum cleaning tool is comprised of a housing with a bottom plate having a working slot extending transversely to the working direction. The brush roller that is rotatably supported in the housing acts through the working slot onto the surface to be worked on, for example, a floor surface, an upholstery surface, a carpet, or the like.

In the housing of the vacuum cleaning tool, a drive motor is provided for driving the brush roller. The drive motor can be configured as an electric motor or as an air turbine. The motor drives the working tool by means of a belt drive comprising a driving wheel driven by the motor shaft as well as a driven wheel fixedly connected to the working tool. The belt is usually guided about the base member of the brush roller so that it is difficult to exchange the brush roller. For different floor surfaces, different working tools are expedient so that the user must have several vacuum cleaning tools at his disposal.

SUMMARY OF INVENTION

It is an object of the present invention to configure the cleaning tool having a rotatably driven working tool such that an easy exchange of the working tool is possible without any impairment of the changing action as a result of the drive.

In accordance with the present invention, this is achieved in that the driving wheel and the driven wheel are pulleys and in that, for providing a driving connection between the driving wheel and the driven wheel, a V-gear is provided whose outer periphery engages peripheral grooves of the driving wheel and of the driven wheel.

The driving wheel and the driven wheel are configured as V-belt pulleys wherein, for providing a driving connection between the wheels, a V-gear is provided whose outer circumference engages the V-grooves of the driving wheel and the driven wheel. In reversing this action principle, it is also possible to configure the driving wheel and the driven wheel as V-gears and to configure the connecting gear as a V-belt pulley.

The drive according to the invention is self-cleaning and not easily soiled. In the unloaded rest state, between the wheels and the V-gear hardly any forces are acting because the frictional grooved gear system requires no great pre-stress. When under load, the driving wheel has the tendency to pull the V-gear into the gap between the driving wheel and the driven wheel so that its outer periphery is forced into frictional contact in the V-grooves of the driving wheel and the driven wheel. The force transmission is realized exclusively via the flanks of the V-grooves as well as the flanks of the outer periphery of the V-gear.

Preferably, the outer periphery of the V-gear is elastically configured and formed by an elastic driving ring such as a V-belt ring that is secured on the base member of the V-gear. The driving ring or the V-belt ring has preferably a trapezoidal cross-section whose longer base is arranged on the base member of the V-gear.

The V-gear acting in the gap between the driving wheel and the driven wheel must not be positionally secured for achieving a force-transmitting connection. The V-gear and/or one of the gear wheels can be movable relative to one another. When the V-gear rotates about an axis of rotation secured on the housing, a radial bearing clearance of at least one wheel or of the V-gear is expedient. The bearing clearance ensures a relative movement of the V-gear to the driving wheel and the driven wheel so that a torque transmitting engagement of the gear connection is ensured. Advantageously, the rotary center points of the driving wheel and of the driven wheel are fixed at the housing and the V-gear is movable in the gap between the wheels. In this way, the V-gear can be secured on a pivot arm that is fixedly connected to the housing and forces the V-gear with a contacting force into the V-grooves of the pulleys. The contacting force can be a weight force and/or a spring force. Advantageously, a stop limits the insertion movement of the V-gear into the gap between the wheels and, in this way, lowers stress of the gear system.

In an advantageous embodiment, the axis of rotation of the V-gear and the driving wheel are secured on the housing while the driven wheel is movable relative to the rotary center point of the V-gear. When the driven wheel is fixedly connected to the working tool, for example, a brush roller, and when the support of the working tool is configured as a slide bearing, the working tool, when placed onto the floor, is moved in the direction toward the V-gear so that the driven wheel engages frictionally the V-gear and the gear connection to the drive motor is realized. When the operator lifts the cleaning tool off the floor, the working tool moves with the driven wheel into its initial position so that the driving connection between the driven wheel and the V-gear is canceled. The tool is without drive action and stops.

It can be expedient to design the base member of the V-gear as a disc and to provide it with an axial thickness that matches essentially the thickness of the base area of the elastic driving ring or V-belt ring.

The gear system that can be easily detached and reconnected enables a flexible configuration of cleaning tools with rotatably driven rollers. In accordance with the floor properties, the rollers can be exchangeably arranged in the housing wherein, for exchanging them, no measures for releasing the gear connection are required. The action of releasing the cleaning tool from the housing releases at the same time the gear connection. When connecting a different changing carrier with a working tool to the housing, the gear connection is realized again in the same way. In particular, the gear system is indifferent with regard to dirt and spacing tolerances that may occur between the driving wheel and the driven wheel. Dirt that has been taken up by the gear system will simply fall out upon releasing the gear connection.

DETAILED DESCRIPTION

Figure 1:
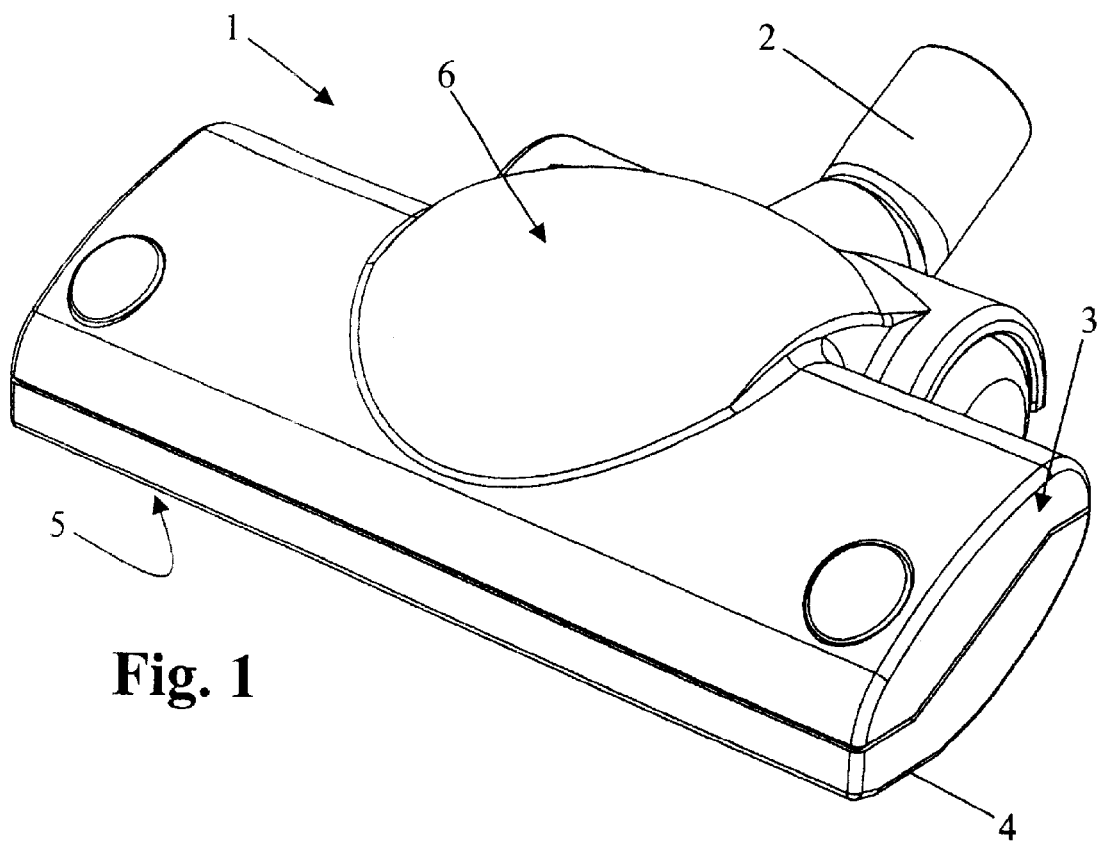
FIG. 1 is a schematic perspective view of the cleaning tool according to the invention.
Figure 2:
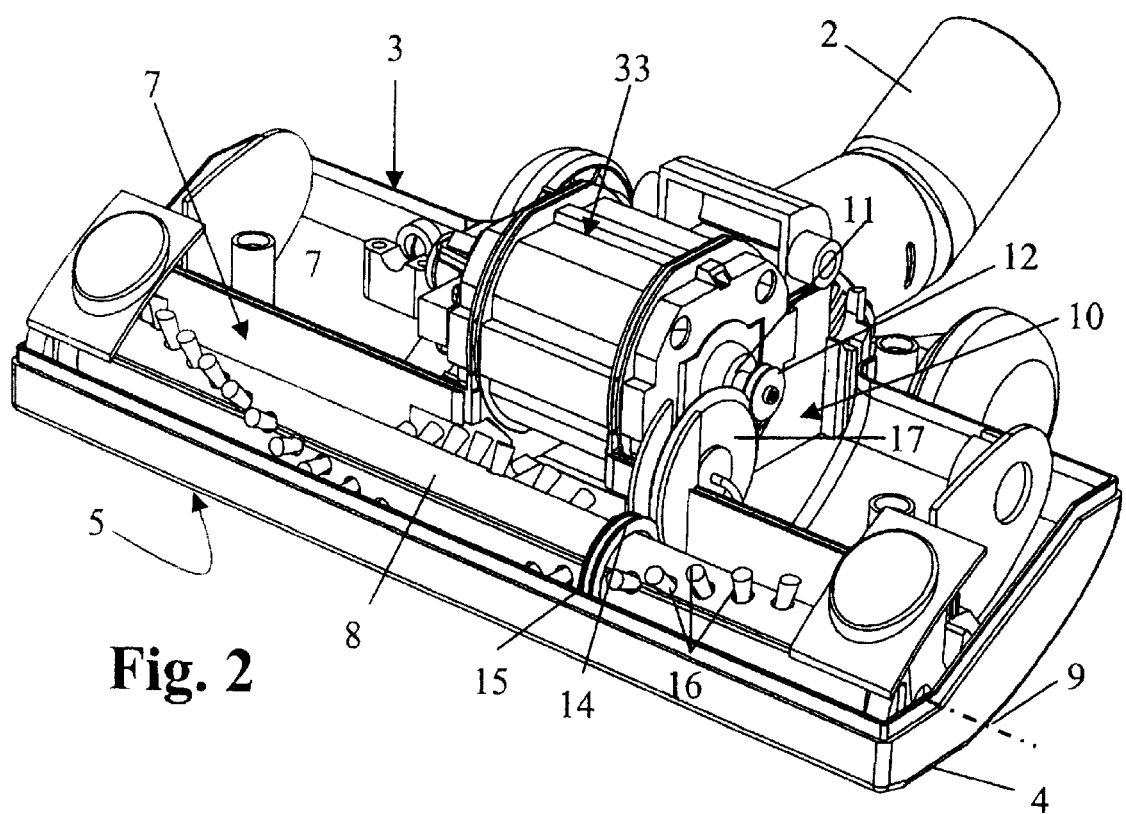
FIG. 2 is a view corresponding to FIG. 1 with the housing opened.
Figure 3:
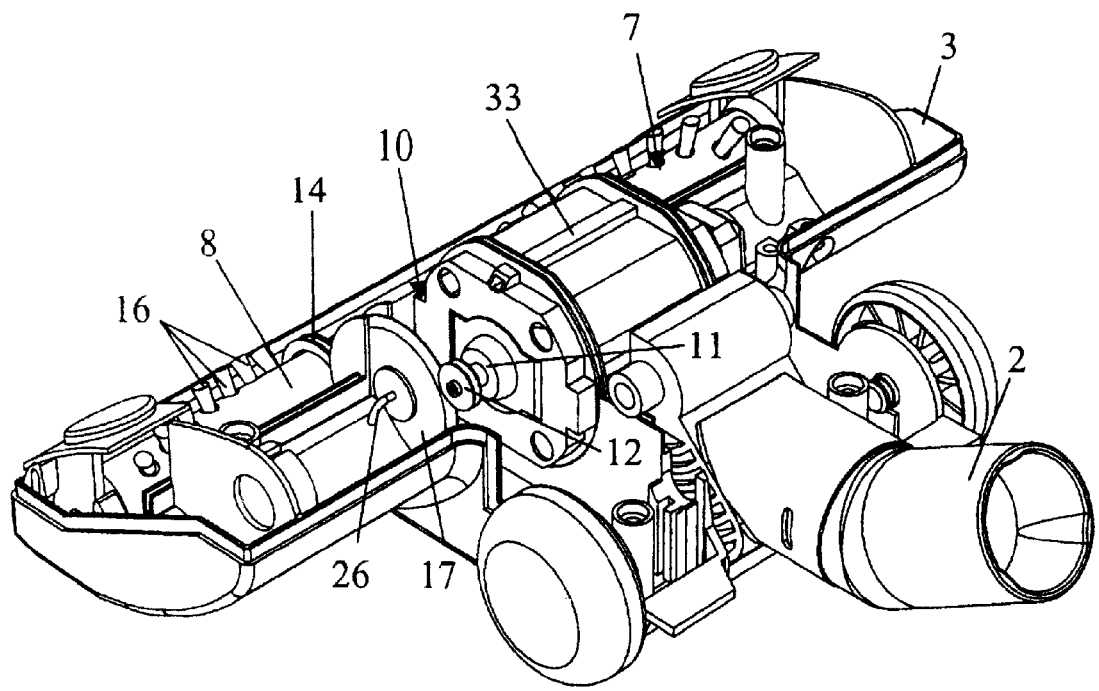
FIG. 3 is a perspective view of the cleaning tool according to FIG. 2 viewed in a direction away from the vacuum connector.

The cleaning tool 1 schematically illustrated in FIG. 1 is a vacuum cleaning tool that is connected in particular to a vacuum cleaning device (not illustrated) such as a vacuum cleaner or the like via a vacuum socket 2. In the illustrated embodiment, the cleaning tool 1 is comprised of a two-part housing 3 having a bottom plate 4 in which a working slot 5 is provided. In the housing 3, a drive unit 6 is integrated; in the illustrated embodiment, it comprises an electric motor 33 that can be seen in FIG. 2 because the upper housing part is removed. In the illustrated embodiment, the working tool 7 is a brush roller supported in the housing 3 so as to rotate about a horizontal axis 9 and acting through the working slot 5 provided in the bottom plate 4 onto the surface to be cleaned or treated, for example, a floor.

Figure 4:
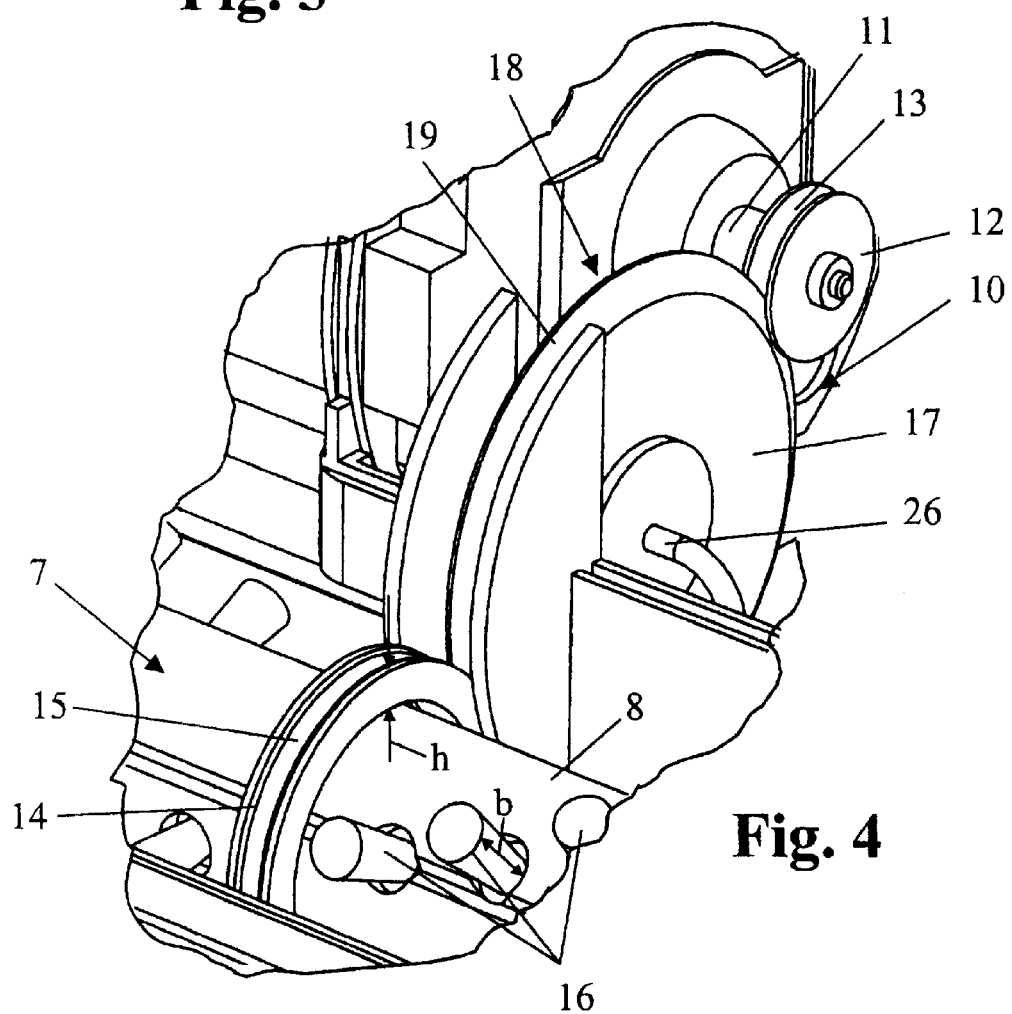
FIG. 4 is an enlarged illustration of frictional grooved gear system.

The drive motor that is supported in the housing 3 and is embodied as an electric motor or also as an air turbine, e.g., a Pelton turbine, flow-through turbine or the like, drives via a gear system 10 the working tool 7 in rotation. For this purpose, on the motor shaft 11 a driving wheel 12 is provided and fixedly secured thereon. It is preferably embodied as a wheel with an outer peripheral groove 13 (FIG. 4). Preferably, the driving wheel 12 is a pulley, in particular, a V-belt pulley.

On the base member 8 of the rotatable working tool 7—in the shown embodiment a brush roller—a driven wheel 14 is provided that also has a peripheral groove 15 and is embodied preferably as a pulley, in particular, a V-belt pulley. In the illustrated embodiment, the V-belt pulley 14 is a ring that is fixedly secured on the base member 8 of the working tool 7. The height h (FIG. 4) is smaller than the length b of the bristles 16 of the bristle arrangement of the brush roller. The driven wheel 14 is positioned in the gap between two neighboring bristle bundles. Also, the driven wheel 14 can be configured as a monolithic part of the member 8 of the working tool 7.

As a driving connection between the driving wheel 12 and the driven wheel 14, a V-gear 17 is provided. The V-gear 17 is illustrated at a larger scale in FIGS. 4 to 6. The outer periphery 18 of the V-gear 17 is preferably elastically configured and engages the V grooves 13, 15 of the expediently rigidly embodied wheels 12, 14. This is shown in particular in the Illustration of FIGS. 4 to 6. The V-gear 17 or at least its outer periphery 18 can however be configured rigidly; for example, the V-gear 17 can be comprised of steel. The V-belt pulleys 12 and 14 engaging the V-gear 17 are then advantageously embodied of an at least partially elastic material in the area of the V-grooves. In a further embodiment of the invention, the V-gear and the wheels can be rigid and/or elastic.

Figure 5:
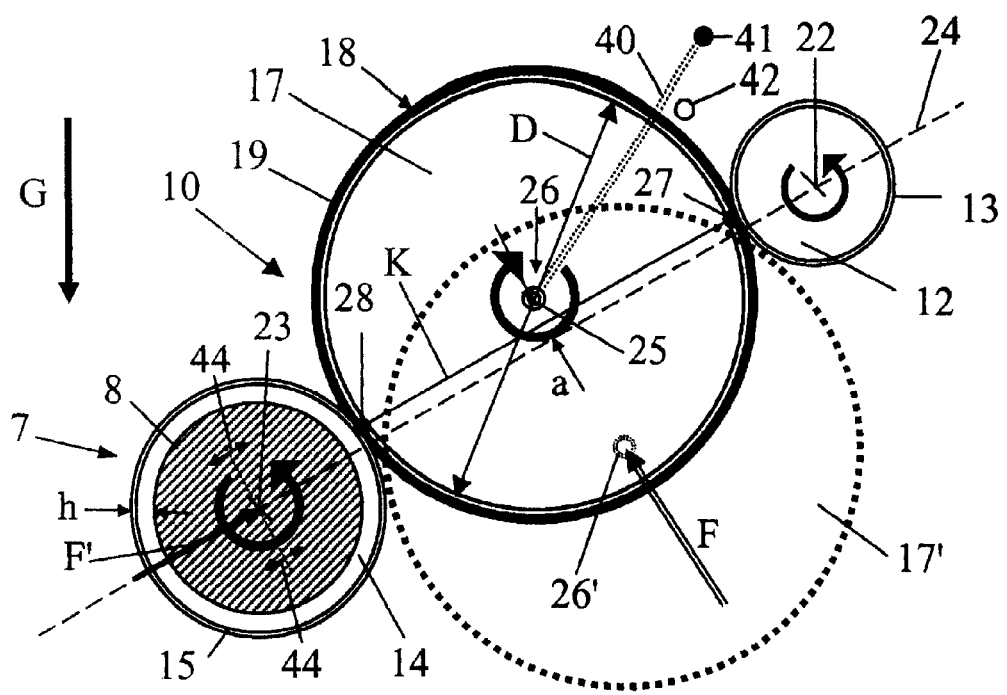
FIG. 5a schematic illustration of the frictional grooved gear system in a side view.
Figure 6:
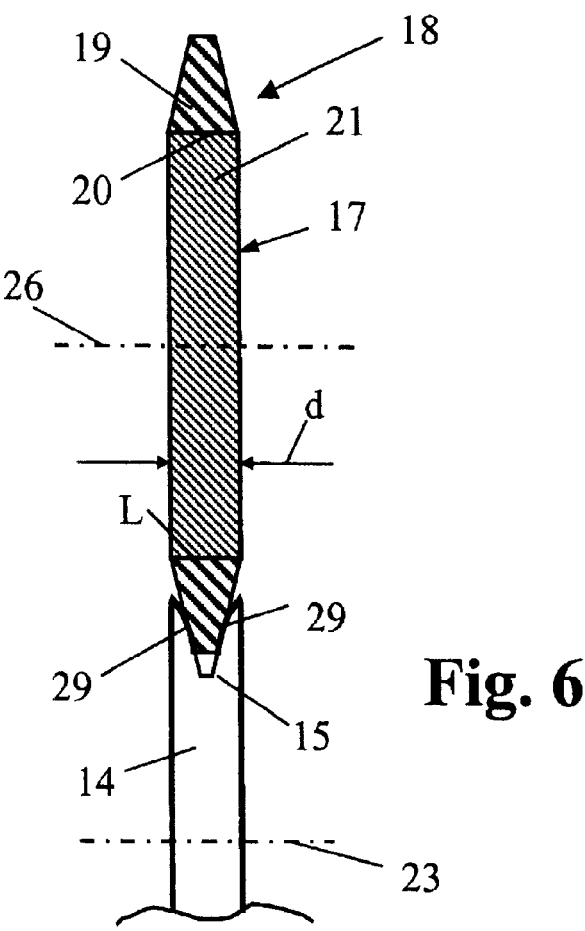
FIG. 6 is a section of the V-gear and a driving wheel.

As illustrated in FIG. 5, the driving wheel 12 rotates counterclockwise so that the V-gear 17 is driven in the clockwise direction. Correspondingly, the driven gear 14 is then rotated counterclockwise. The outer periphery 18 of the V-gear 17 in the illustrated embodiment is formed by an elastic driving ring which, as shown in FIG. 6, is a V-belt ring 19. In this connection, the V-belt ring 19 preferably has a trapezoidal cross-section in accordance with FIG. 6, wherein the longer base 20 of the trapezoidal cross-section is positioned on the base member 21 of the V-gear 17.

The axis of rotation 22 of the driven wheel 12 as well as the axis of rotation 23 of the driven pulley 14 form rotary center points that define a connecting line 24. The rotary center point 25 of the V-gear 17 is positioned at a spacing a to the connecting line 24, wherein the rotary center point 25 can be formed by an axis of rotation 26 fixed at the housing. The position of the V-gear 17 is selected such that the driving wheel 12 driven by the motor has the tendency to rotate the V-gear 17 into the gap between the driving wheel 12 and the driven wheel 14. Relative to the point of attack 27 of the force between the driving wheel 12 and the V-gear 17, the rotary center point 25 of the V-gear 17 is thus located on the side of the connecting line 24 opposite the driving force into the gap.

In order to safely ensure in the case of axes of rotation 22, 23, and 26 that are fixed at the housing an engagement of the V-gear 17 independent of dimensional tolerances that may be present, it is provided that at least the V-gear 17 is supported with radial bearing clearance on the member forming the axis of rotation 26.

The point of attack 27 of the force of the driving wheel 12 at the V-gear 17 and the point of attack 28 of the force of the V-gear 17 at the driven wheel 14 have a spacing K from one another that is smaller than the diameter D of the V-gear 17.

In another embodiment, the V-gear 17 can be secured to the end of a pivot lever 40 that is pivotable about a pivot axis 41 secured at the housing. The position of the pivot lever 40 is preferably selected such that the V-gear 17 in the operational position of the cleaning tool is force-loaded by its weight force G into the gap between the driving and driven wheels 12 and 14. The weight force G that acts on the V-gear 17 ensures that the outer periphery 18 that is elastic in this embodiment rests with minimal contacting force in the peripheral grooves 13 and 15 of the V-belt pulleys 12 and 14. When the driving wheel 12 rotates, the driving torque effects a further pivoting of the V-gear 17 into the gap between the V-belt pulleys 12 and 14 so that the gear system 10 can transmit high torques. In this connection, the torque transmission is realized via the flanks 29 (FIG. 6) of the driving ring or V-belt ring 19 onto the outer periphery 18 of the V-gear 17 and the flanks of the peripheral grooves 13 and 15 of the V-belt pulleys 12 and 14. In order to prevent upon transmission of high torques a too great pulling action of the V-gear 17 into the gap between the V-belt pulleys 12 and 14, a stop 42 is provided that limits the pivot movement of the pivot arm 40 in the direction toward the gap. When a cleaning tool provided with such a V-gear system according to the invention is lifted off the floor and rotated by 180E with regard to its position, the weight force G acts contrary to the arrow indicated in FIG. 5 so that the pivot arm 40 pivots with the V-gear 17 out of the gap between the V-belt pulleys 12 and 14. The gear connection is interrupted and the working tool 7 will stop.

In another configuration of the invention illustrated in FIG. 5 in dashed lines, the V-gear 17' is positioned on the side of the connecting line 24 opposite the pivot arm 40 and is forced by a spring force F acting on the axis of rotation 26' into the gap between the V-belt pulleys 12 and 14. The V-gear 17' that is movably supported in this way can transmit a torque that is determined by the size of the spring, i.e., its spring force F. When the torque required at the working tool 7 is to great, the driving wheel 12 will lift the V-gear 17 so that a torque limitation is provided.

When the axes of rotation 22 and 23 of the V-belt pulleys 12 and 15 are fixed at the housing, the V-gear 17 is expediently arranged so as to be moveable. It can be advantageous to fixedly arrange the axis of rotation 22 of the driving wheel 12 as well as the axis of rotation 26 of the V-gear 17 at the housing in order to arrange the axis of rotation 23 of the driven pulley 14 so as to be moveable. Accordingly, as illustrated in FIG. 5, the driven wheel 14 can be movable in the direction of the double arrow 44 along the connecting line 24 wherein, for obtaining a force engagement, a contacting force acts approximately along the connecting line 24 in the direction toward the V-gear 17. The movability of the driven wheel 14 can be achieved by a corresponding sliding arrangement of the base member 8 of the working tool 7. When the cleaning tool is lifted off the floor, the driven wheel can be moved against the force F', as a result of the weight force or a spring force, and can thus be disengaged. This has the advantage that, when the cleaning tool is lifted off the floor, the driving connection of the gear system 10 is interrupted and the working tool is stopped in this way. Therefore, the risk of injury for the user is lowered. Only when the cleaning tool is placed onto the floor again, the working tool 7, because of the contact on the floor surface to be cleaned, is slightly moved into the housing, wherein, for example, by means of a corresponding configuration of the slide bearing a movement of the base member 8 together with the driven wheel 14 along the connecting line 24 in the direction toward the V-gear 17 is realized until the V-groove 15 of the V-belt pulley 14 engages the V-gear 17. The driving connection of the gear system 10 is thus realized. The working tool 7 is driven in rotation by the motor.

The base member 21 of the V-gear 17, as shown in FIG. 6, is disc-shaped and has, in particular, in the area of the outer periphery 18 an axial thickness d that substantially matches the thickness of the base area of the elastic driving ring or V-belt ring 19, i.e., in the illustrated embodiment it matches the length L of the base side 20 of the cross-section of the V-belt ring 19. The base member 21 of the V-gear 17 is advantageously comprised of a rigid or a partially elastic material.

As illustrated in FIG. 6 in connection with the driven wheel 14, the V-gear ring 19 engages with its free outer periphery the V-groove 15 of the driving wheel 12, wherein in the area of the flanks 29 of the V-groove 15 the force transmission is realized by friction. In this connection, the V-gear 17 is pulled into the gap between the driving wheel 12 and the driven wheel 14. This movement is limited by a stop provided on the housing.

Under load, a high frictional connection between the driving wheel 12 and the V-gear 17 as well as between the V-gear 17 and the driven wheel 14 is obtained so that high torques can be transmitted. At the same time, the gear system 10 also provides an overload protection since, for example, in the case of a locked brush roller 8, slipping of the V-gear flanks in the V-grooves 13 to 15 is principally possible. In order to be able to transmit a high torque, the force transmission is provided exclusively via the flanks of the V-belt ring 19 and the flanks 29 of the V-grooves 13 or 15. For this purpose, the grooves 13, 15 of the driving and driven wheels 12, 14 must be embodied deeper than the engagement depth of the V-belt ring 19.

Figure 7:
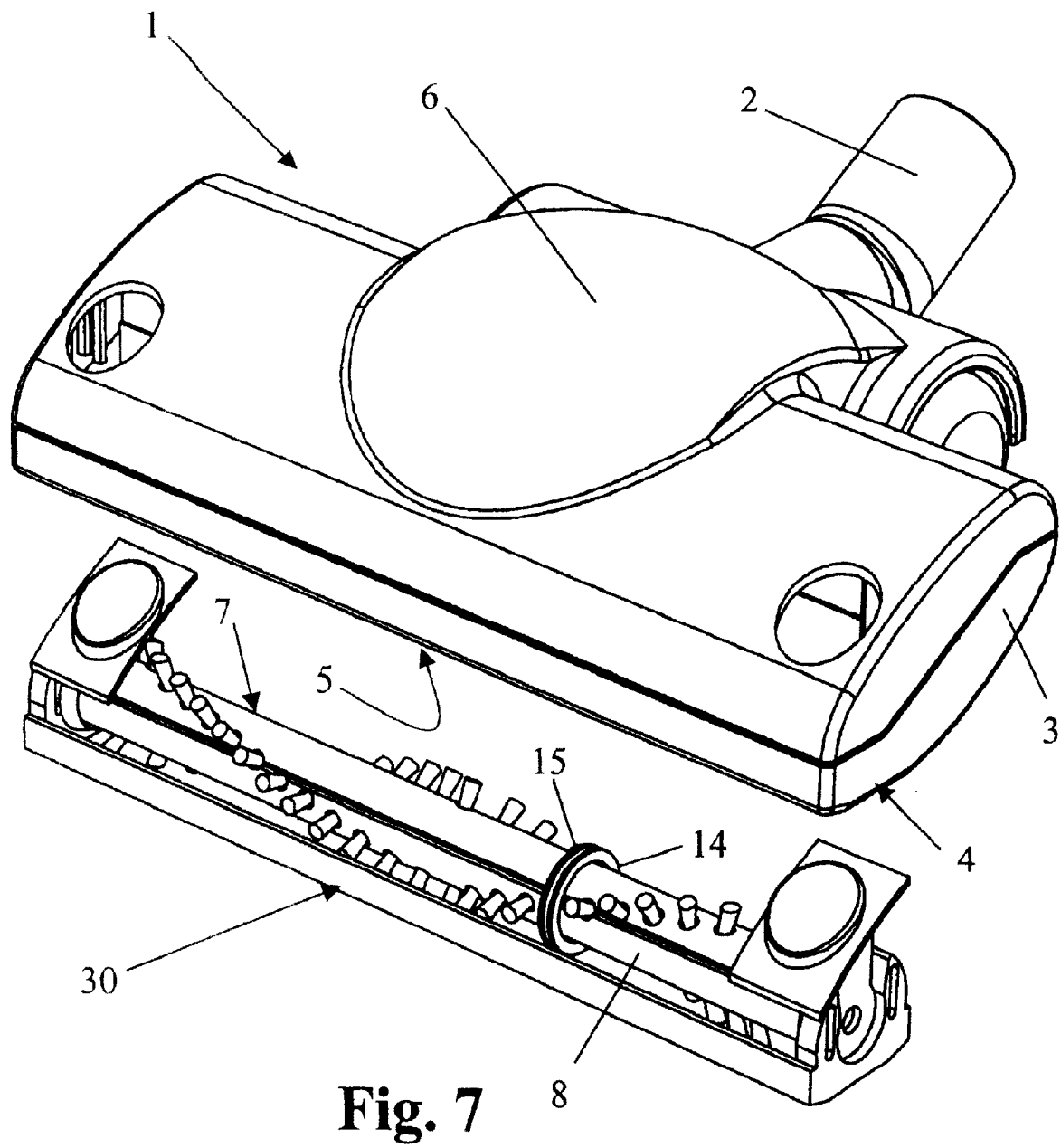
FIG. 7 is a schematic perspective illustration corresponding to FIG. 1 with demounted working tool.

The gear system 10 according to the invention enables a simple exchange of the working tool 7 that is preferably secured in a changing carrier 30 (FIG. 7) at the housing 3. The changing carrier 30 in the shown embodiment is inserted into a corresponding receiving opening in the bottom plate 4 and secured in its mounting position, in particular, by snapping into place. When the working tool 7 has reached its mounting position in the housing 3, the V-belt ring 19 engages precisely the groove 15 of the driven wheel 14 that is connected fixedly to the working tool 7. In this way, there are several possibilities of inserting working tools 7 in an exchangeable way into the housing 3, wherein, for detaching the working tool 7 from the housing 3 as well as for inserting the tool 7 into the housing 3, the gear or driving connection (at 10) by means of the V-gear 17 can be easily disengaged and re-engaged.

The driving ring provided on the V-gear 17 can be comprised preferably of a polyurethane mixture and of inner tension cords, in particular, made of fabric, providing sufficient shape stability at high force transmission. It can be expedient to secure the driving ring on the base member 21 of the V-gear 17, for example, by vulcanizing it thereto, connecting it by injection molding or by an adhesive, so that tension cords are not required. In this connection, materials that are matched to the individual situation, for example, polyamide, can be used.

While specific embodiments of the invention have been shown and described in detail to illustrate the inventive principles, it will be understood that the invention may be embodied otherwise without departing from such principles.

What is claimed is:

1. A cleaning tool for a vacuum cleaning device, the cleaning tool comprising:
    a housing having a bottom plate provided with a working slot;
    a rotatingly driven working tool rotatably supported in the housing and passing through the working slot so as to act on a surface to be cleaned;
    a motor arranged in the housing and having a motor shaft;
    a gear system connected between the motor and the working tool, wherein the gear system has a driving wheel driven by the motor shaft and a driven wheel fixedly connected to the working tool;
    wherein the driving wheel and the driven wheel are V-belt pulleys and have a peripheral groove, respectively;
    wherein the gear system further comprises a V-gear positioned between the driving wheel and the driven wheel, wherein the V-gear has an outer periphery that engages the peripheral grooves for establishing a driving connection between the driving wheel and the driven wheel;
    wherein at least one of the V-gear and one of the driving and driven wheels are movable relative to one another;
    wherein the driving wheel has a first rotary center point and the driven wheel has a second rotary center point, wherein the first and second rotary center points define a connecting line, and wherein a rotary center point of the V-gear is positioned at a spacing from the connecting line;
    wherein the first and second rotary center points are fixed at the housing and wherein the V-gear is movable into a gap between the driving wheel and the driven wheel;
    a pivot arm, wherein the V-gear is secured on the pivot arm, and wherein a maximum pivot stroke of the pivot arm is limited by a stop.

2. The cleaning tool according to claim 1, wherein the outer periphery of the V-gear is elastic.

3. The cleaning tool according to claim 2, wherein the outer periphery is comprised of an elastic V-belt ring.

4. The cleaning tool according to claim 3, wherein the V-gear has a base member and the V-belt ring has a trapezoidal cross-section having a long base and a short base, wherein the long base is secured on the base member.

5. The cleaning tool according to claim 4, wherein the V-gear has a base member that is disc-shaped and has an axial thickness matching approximately a thickness of a base area of the elastic V-belt ring.

6. The cleaning tool according to claim 5, wherein the V-belt ring is comprised of a polyurethane mixture.

7. The cleaning tool according to claim 5, wherein the V-belt ring has tension cords comprised of fabric.

8. A cleaning tool for a vacuum cleaning device, the cleaning tool comprising:
- a housing having a bottom plate provided with a working slot;
- a rotatingly driven working tool rotatably supported in the housing and passing through the working slot so as to act on a surface to be cleaned;
- a motor arranged in the housing and having a motor shaft;
- a gear system connected between the motor and the working tool, wherein the gear system has a driving wheel driven by the motor shaft and a driven wheel fixedly connected to the working tool;
- wherein the driving wheel and the driven wheel are V-belt pulleys and have a peripheral groove, respectively;
- wherein the gear system further comprises a V-gear positioned between the driving wheel and the driven wheel, wherein the V-gear has an outer periphery that engages the peripheral grooves for establishing a driving connection between the driving wheel and the driven wheel;
- wherein at least one of the V-gear and one of the driving and driven wheels are movable relative to one another;
- wherein the driven wheel is movable relative to an axis of rotation of the V-gear.

9. The cleaning tool according to claim 8, wherein the driving wheel has a first rotary center point and the driven wheel has a second rotary center point, wherein the first and second rotary center points define a connecting line, and wherein a rotary center point of the V-gear is positioned at a spacing from the connecting line.

10. The cleaning tool according to claim 9, wherein the first and second rotary center points are fixed at the housing and wherein the V-gear is movable into a gap between the driving wheel and the driven wheel.

11. The cleaning tool according to claim 10, further comprising a pivot arm, wherein the V-gear is secured on the pivot arm, and wherein a maximum pivot stroke of the pivot arm is limited by a stop.

12. The cleaning tool according to claim 10, wherein the V-gear is loaded by a contacting force into the gap between the driving and driven wheels.

13. The cleaning tool according to claim 12, wherein the contacting force at least one of a weight force and a spring force.

14. A cleaning tool for a vacuum cleaning device, the cleaning tool comprising:
- a housing having a bottom plate provided with a working slot;
- a rotatingly driven working tool rotatably supported in the housing and passing through the working slot so as to act on a surface to be cleaned;
- a motor arranged in the housing and having a motor shaft;
- a gear system connected between the motor and the working tool, wherein the gear system has a driving wheel driven by the motor shaft and a driven wheel fixedly connected to the working tool;
- wherein the driving wheel and the driven wheel are V-belt pulleys and have a peripheral groove, respectively;
- wherein the gear system further comprises a V-gear positioned between the driving wheel and the driven wheel, wherein the V-gear has an outer periphery that engages the peripheral groves for establishing a driving connection between the driving wheel and the driven wheel;
- wherein the working tool comprises a changing carrier and wherein the working tool is detachably secured with the changing carrier at the housing.

15. A cleaning tool for a vacuum cleaning device, the cleaning tool comprising;
- a housing having a bottom plate provided with a working slot;
- a rotatingly driven working tool rotatably supported in the housing and passing through the working slot so as to act on a surface to be cleaned;
- a motor arranged in the housing and having a motor shaft;
- a gear system connected between the motor and the working tool, wherein the gear system has a driving wheel driven by the motor shaft and a driven wheel fixedly connected to the working tool;
- wherein the driving wheel and the driven wheel are V-belt pulleys and have a peripheral groove, respectively;
- wherein the gear system further comprises a V-gear positioned between the driving wheel and the driven wheel, wherein the V-gear has an outer periphery that engages the peripheral grooves for establishing a driving connection between the driving wheel and the driven wheel;
- wherein a depth of the peripheral groove of at least one of the driving and driven wheels is greater than an engagement depth of the outer periphery of the V-gear.

16. The cleaning tool according to claim 15, wherein at least one of the V-gear and one of the driving and driven wheels are movable relative to one another.

17. The cleaning tool according to claim 15, wherein the outer periphery of the V-gear is elastic.

18. The cleaning tool according to claim 17, wherein the outer periphery is comprised of an elastic V-belt ring.

19. The cleaning tool according to claim 18, wherein the V-gear has a base member and the V-belt ring has a trapezoidal cross-section having a long base and a short base, wherein the long base is secured on the base member.

20. The cleaning tool according to claim 19, wherein the V-gear has a base member that is disc-shaped and has an axial thickness matching approximately a thickness of a base area of the elastic V-belt ring.

* * * * *